United States Patent Office 2,739,078
Patented Mar. 20, 1956

2,739,078

PRODUCT AND PROCESS

Edward C. Broge, Cecil County, Md., assignor to E. I. du Pont de Nemours and Company, Wilmington, Del., a corporation of Delaware No Drawing. Application March 6, 1952,
Serial No. 275,248

7 Claims. (Cl. 106—308)

This invention relates to surface-modified finely divided siliceous solids and to their production. It is more particularly directed to inorganic siliceous particles having an average specific surface area of at least 1 square meter per gram, having chemically bound to the silicon atoms on the surface of said particles at least 100 —ORO— groups per 100 square millimicrons of surface area of the siliceous solid, where R is a divalent hydrocarbon radical having from 2 to 18 carbon atoms and in which each of the two carbon atoms attached to oxygen is also attached to at least one hydrogen atom.

The method of surface-modifying dense siliceous particles in accordance with this invention comprises chemically reacting in a hydrocarbon solvent substrate particles of inorganic siliceous material having an average specific surface area of at least 1 square meter per gram with a glycol of formula HOROH where R is a divalent hydrocarbon radical having from 2 to 18 carbon atoms and in which each of the carbon atoms attached to oxygen is also attached to at least one hydrogen atom.

The products of the invention are a specific kind of siliceous solids. Some of these products I refer to hereafter as estersils. Estersils are solids made by chemically reacting hydroxy compounds with certain supercolloidal siliceous solids. The reaction I have called esterification and the chemically bound —ORO— groups resulting therefrom I have called substituted ester groups.

For a detailed description of estersils prepared from primary and secondary unsubstituted monohydric alcohols, reference is made to the copending U. S. application of Ralph K. Iler, Serial No. 171,759, filed July 1, 1950, now abandoned, or to Iler United States Patent 2,657,149, issued October 27, 1953, as a continuation in part of said application Serial No. 171,759, in which estersils of that class are claimed.

The substrate

The materials used to form the skeleton or internal structure, the so-called substrate, of the products of my invention are solid inorganic siliceous materials. They contain substantially no chemically bound organic groups. They have reactive surfaces which I believe to result from surface silanol (—SiOH) groups. The substrate materials can be mineral or synthetic in origin. They can be amorphous silica. They can be water-insoluble metal silicates. They can be water-insoluble metal silicates coated with amorphous silica.

For the purposes of this invention the substrate particles should have an average diameter greater than about 1 millimicron. Substrate particles in which the ultimate units have diameters of at least 5 millimicrons but less than 100 millimicrons are preferred. Another preferred type of substrate particles are supercolloidal aggregates or pulverulent solids.

It is further preferred that the inorganic siliceous solids used are porous, that is, they have exposed surfaces in the interior of the particle which are connected to the exterior so that liquids and gases can penetrate the pores and reach the exposed surfaces of the pore walls. In other words, the solid forms a three-dimensional network or webwork through which the pores or voids or interstices extend as a labyrinth of passages or open spaces.

Especially preferred are porous inorganic siliceous solids having average pore diameter of at least four millimicrons. The large pores afford easy access for glycol molecules in the subsequent esterification to give the products of the invention.

The substrate particles have large surface areas in relation to their mass. The term used herein and the one normally so used in the art to express the relationship of surface area to mass is "specific surface area." Numerically, specific surface area will be expressed in square meters per gram ($m.^2/g.$).

According to the present invention, the substrate particles have an average specific surface area of at least 1 square meter per gram and preferably the average specific surface area is at least 25 $m.^2/g$. In the case of precipitated amorphous silica, a preferred material, there is an optimum range of about 200 to 400 $m.^2/g.$, based on the fact that in this range the supercolloidal particles or aggregates can be obtained in a dry state without bringing about a considerable collapse of the porous structure by replacing the water with a water-miscible organic solvent such as acetone and then drying. This powder is especially suitable for subsequent esterification. It is, of course, possible to produce very voluminous aerogels by processes of the prior art, having surface areas of from 200 to 900 $m.^2/g$. Such highly porous forms of silica can be surface-esterified by the process of this invention.

Specific surface area, as referred to herein, is determined by the accepted nitrogen adsorption method described in an article "A New Method for Measuring the Surface Areas of Finely Divided Materials and for Determining the Size of Particles" by P. H. Emmett in Symposium on New Methods for Particle Size Determination in Sub-Sieve Range published by the American Society For Testing Materials, March, 1951, page 95. The value of 0.162 square millimicron for the area covered by one surface adsorbed nitrogen molecule is used in calculating the specific surface areas.

Pore diameter values are obtained by first determining pore volume from nitrogen adsorption isotherms as described by Holmes and Emmett in Journal of Physical and Colloid Chemistry 51, 1262 (1947). From the volume figure, the diameters are obtained by simple geometry assuming cylindrical pore structure.

Determinations of gross particle size and shape of substrate material are suitably made by a number of standard methods whose choice for use in a particular case depends upon the approximate size and shape of the particles and the degree of accuracy desired. Thus, for coarse materials, the dimensions of individual particles or coherent aggregates can be determined with the unaided eye and ruler or calibers. For more finely powdered material, the light microscope is used with a calibrated scale. For materials having a particle size in the range of from 2 or 3 microns down to 5 millimicrons, the electron microscope is used. Particle size determination using an electron microscope is described in detail by J. H. L. Watson in Analytical Chemistry 20, 576 (1948).

While various inorganic siliceous solids having the aforementioned properties can be used as substrate materials in preparation of the products of my invention, precipitated amorphous silica is particularly preferred. Such silica is characterized by X-rays as lacking crystalline structure.

The preparation of several suitable amorphous silicas is illustrated in the examples. For a detailed discussion of sources of amorphous silica for use in preparing esters of primary and secondary alcohols, reference should be had to the copending U. S. application of Ralph K. Iler, Serial No. 171,759, filed July 1, 1950, now abandoned.

Instead of silica, water-insoluble metal silicates can be used as the substrate. Such metal silicates can be prepared, as is well known in the prior art, by treatment of silicas with metal salts or hydrous metal oxides, excluding those containing only alkali metal ions. Such metal silicates can be prepared so as to have a large number of silanol (—SiOH) groups on the surface of the particle. Thus, metal silicates having a large proportion of metal ions on the surface may be activated for esterification by washing with acids to remove a portion of the metal ion and leave surface silanol groups.

Crystalline metal silicates occurring in nature can also be used. However, the proportion of silanol groups on most minerals is very small since the surfaces also contain metal hydroxy groups, silicon oxygen groups and adsorbed metal ions. Therefore, before esterification it is necessary to introduce silanol groups on the surface. Loosely adsorbed metal ions may be exchanged for hydrogen ions by washing the dilute acids or by treatment with ion exchange resins. In some cases, more vigorous treatment, such as reaction with acids at low pH and often at elevated temperatures are required to give a material which will contain a sufficient number of silanol groups in the surface to yield an organophilic product on esterification.

Alternatively or additionally, silanol groups can be introduced on the surface of metal silicates by coating them with a layer of amorphous silica. This is accomplished by treating, say, sodium silicate with an acid in the presence of the mineral silicate particles under such conditions that the silica formed will deposit as a coating on the mineral particle.

Mineral crystalline silicates which can be used in preparing the substrate particles are as follows: the asbestos minerals, such as chrysotile asbestos and serpentine (hydrous magnesium silicate) and amphiboles such as crocidolite asbestos (a sodium magnesium iron silicate), amosite (an iron silicate), tremolite (a calcium magnesium silicate), and anthothyllite (a magnesium iron silicate); clay materials, such as halloysite (an aluminum silicate), attapulgite (a magnesium aluminum silicate), hectorite (a magnesium lithium silicate), nontronite (magnesium aluminum iron silicate); the kaolins, such as kaolinite, nacrite and dickite (aluminum silicate); and bentonites, such as beidillite, saponite and montmorillonite (magnesium aluminum iron silicates); and micaceous minerals, such as phlogopite (a potassium magnesium aluminum silicate), muscovite (a potassium aluminum silicate), biotite (a potassium iron aluminum silicate) and vermiculite (a hydrous magnesium iron aluminum silicate).

The esterifying agent

The inorganic siliceous solids described above react chemically with glycols to give the products of the invention. The glycols herein called esterifying agents are represented by the formula HOROH where R is a divalent hydrocarbon radical in which each of the carbon atoms attached to an oxygen of the hydroxyl groups is also attached to at least one hydrogen, the hydrocarbon radical having from 2 to 18 carbon atoms.

As examples of suitable esterifying agents there may be named ethylene glycol, trimethylene glycol, tetramethylene glycol, pentamethylene glycol, hexamethylene glycol, heptamethylene glycol, octamethylene glycol, nonamethylene glycol, decamethylene glycol, undecamethylene glycol, dodecamethylene glycol, tridecamethylene glycol, tetradecamethylene glycol, pentadecamethylene glycol, hexadecamethylene glycol, heptadecamethylene glycol, octadecamethylene glycol, 4,5-octanediol, 2,4-hexanediol and 2,4-actanediol.

Technically, there is no upper limit to the number of carbon atoms which may be present in the esterifying agent. As a practical matter, however, the group of glycols having from 2 to 18 carbon atoms include the majority of common glycols and offer a selection of molecule sizes which should be adequate for any purpose.

Glycols containing from 2 to 6 carbon atoms are preferred. They are the most economical to use and yield products having a low ratio of organic matter to silica.

The esterifying agent need not be a single glycol. Mixtures of glycols can be used. Thus, when a variety of surface properties is desired, a mixture of glycols can be employed as the esterifying agent.

Esterification

The siliceous substrate to be reacted with both of the hydroxyl groups of the glycol should contain surface silanol groups. Pure amorphous silica which has been in contact with moisture has such a surface. The surface must not be covered with other materials which block access to the silanol group. Metal ions on the surface of metal silicates must be exchanged for hydrogen atoms. This can be done by treatment with a hydrogen form of a cation exchange resin or by treatment with an acid as mentioned heretofore. Alternatively, the particles can be coated with a thin layer of silica. The external surface can then be reacted with glycol.

The inorganic siliceous solid is preferably freed of extraneous material before esterification, and the pH is adjusted to avoid strong acids or alkali in the reaction. The pH is preferably 5 to 8.

The amount of water present in the reacting mass during the esterification step has an important bearing on the degree of esterification that will be obtained. Thus, since the esterification process is an equilibrium reaction, it is ordinarily desirable to keep the water content as low as possible during the course of the reaction.

In order to esterify sufficiently to obtain a high proportion of substituted ester groups on the surface of the siliceous particles, the water in the liquid phase of the system should not exceed about 5% by weight of that phase. For maximum esterification, the water content must be kept below about 1.5%. As already mentioned, it is desirable to keep the water content as low as possible.

Because of the hindering effect of water on the esterification, if the siliceous solid to be esterified is wet, the free water must be removed either before the solid is put into the glycol, or alternatively it may be removed by distillation after mixing with the glycol.

Simple air drying at temperatures of from 100 to 150° C. will remove most of the free water. Drying may be hastened by the application of vacuum. For many types of siliceous solids, however, air drying is not satisfactory because they tend to shrink to hard, compact masses upon drying from water.

Water can suitably be removed from a wet siliceous solid before esterification by displacing the water in the wet mass with a polar organic solvent such as acetone. The solvent can later be recovered.

Preferably, water is removed from wet siliceous solids prior to esterification by azeotropic distillation. Thus, water-wet cake can be mixed with a polar organic solvent such as methyl ethyl ketone and the mixture distilled until the system is freed from water. The organic solvent can then be evaporated to give a dry product for reaction with glycol.

The ratio of glycol and siliceous material to be used in the esterification is important. In order to insure that both hydroxyl groups of the glycol become attached to the silica surface, an excess amount of glycol should be avoided, particularly in those instances where a glycol having its hydroxy groups separated by more than 3 carbon atoms is used.

It will be observed that the glycol should be diluted with a hydrocarbon solvent such as, for instance, benzene, toluene or xylene. The presence of the hydrocarbon solvent prevents local excesses of the glycol from gathering at the silica surface and helps to orient the hydroxyl groups toward the silica surface due to the relatively greater affinity of the hydrocarbon solvent for the hydrocarbon portion of the glycol.

In instances where the glycols used have hydroxyl groups on adjacent carbon atoms or on carbon atoms separated by a single carbon and have long hydrocarbon chains attached to these carbon atoms, it is felt that the glycols are more readily oriented in such a way that both hydroxy groups can be directed toward the surface. Consequently, in these instances, the ratio of glycol to silica may be increased somewhat.

The surface esterification can be effected by refluxing the mixture of the silica, glycol and the hydrocarbon solvent together for a suitable length of time, for example, upwards of 2 hours, or by autoclaving.

The extent of the reaction is fixed more by the temperature than by the time, that is, at a suitable temperature the esterification reaction proceeds quite rapidly up to a certain point which is characteristic of the temperature and of the glycol and thereafter proceeds slowly.

The minimum reaction time and temperature in order to obtain any given extent of reaction varies with the glycol used. While it is difficult to set forth in great detail the relationship between the temperature required for any given extent of reaction and the structure of the glycol, one skilled in the art may learn from the data the general principles involved and conclude what conditions should be used for another glycol.

The temperatures substantially below about 100° C. are not suitable in most instances. Glycol may be adsorbed on the siliceous surface at such temperatures but true esterification is not obtained.

The esterified temperature should not exceed the thermal decomposition point of the glycol while in the presence of siliceous solids. Nor should it exceed the point of thermal stability of the esterified siliceous materials. Preferably, the heating is not prolonged any more than is required to achieve esterification equilibrium.

Whether the reaction is effected at atmospheric pressure at the reflux temperature of the solution or under autoclave conditions will largely depend on the boiling point of the solvent used; that is, whether the boiling point is high enough to effect substantial reaction between the silica and the esterifying agent. Occasionally, it is desirable to deposit a mono layer of the glycol uniformly over the silica surface by stirring the latter with a solution of the glycol in a low boiling, inert solvent such as ether or acetone, and then evaporating the solvent while maintaining constant agitation. Complete reaction is then effected by heating the dry, coated product to a temperature sufficiently high to cause removal of water.

After completion of the esterification, the product estersils can be removed from the solvent and any unreacted glycol by conventional methods. Thus, the separation can be made by filtration in those instances where the estersils consist of particles of supercolloidal size, the estersils being retained on ordinary filter media.

Alternatively, the glycol can be vaporized by applying vacuum to the reaction vessel. If the glycol is one which will distill at atmospheric pressure without decomposition, simple distillation can be used. In the case of higher glycols which are not readily distilled, except under very high vacuum, the glycol can be extracted from the product with a low boiling solvent such as, for instance, methyl ethyl ketone, chloroform or ether.

*Properties and uses of the products*

The products of the invention are in the form of powders or sometimes lumps or cakes which are pulverable under the pressure of the finger or by a light rubbing action. The esterified inorganic siliceous solids are generally exceedingly fine, light, fluffy, voluminous powders.

The esterification reaction does not substantially change the structure of the inorganic siliceous solid or substrate which was esterified. In other words, the internal structure of the estersil, the structure to which the —ORO— groups are chemically bound, has substantially the same particle size, surface area and other characteristics described previously in the discussion of the substrate material. The estersils of the invention are in a colloidal or supercolloidal state of subdivision.

The products of the invention are organophilic. In those instances where a glycol having more than six carbon atoms is employed as the esterifying agent in accordance with this invention the product is hydrophobic.

By the term "organophilic" I mean that when a pinch of estersil is shaken in a two-phase liquid system of water and n-butanol in a test tube the product will "wet" into the n-butanol phase in preference to the water-phase.

In the case of the preferred glycols, it is possible to force more han 100 glycol molecules, say 200 or more, to react per 100 square millimicrons of surface area of the siliceous subtrate by using severe reaction conditions, care being take not to decompose the glycol or the resulting substituted ester group.

The number of ester groups for 100 square millimicrons of siliceous substrate surface is calculated from the expression:

$$\text{Surface area} = \frac{6.02 \times 10^{23} \times C}{12n \times S_n \times 10^{18}} = \frac{50,200 \times C}{n \times S_n}$$

where $C$ is the weight of the carbon in grams attached to 100 grams of substrate; $n$ is the number of carbon atoms in —ORO— groups; $S_n$ is the specific surface area in m.2/g. of the substrate as determined by nitrogen adsorption.

Where the sample to be analyzed is one in which the type of glycol is unknown, the sample can be decomposed with an acid and the glycol can be recovered and identified. The specific surface area of the substrate can be determined by first burning off the ester groups, as for example, by slowly heating the estersil in a stream of oxygen up to 500° C. and holding it at that temperature for a period of about three hours and then rehydrating the surface of the particles by exposure to 100% relative humidity at room temperature for several hours and finally determining the surface area of the remaining solid by nitrogen adsorption method.

The specific hydroxylated surface areas of silicas having surface silanol groups may be calculated by measuring the amount of methyl red dye which will absorb on such surfaces. A description of such a method of determining hydroxylated surface areas has been published by I. Shapiro and I. M. Kolthoff in the Journal of the American Chemical Society 72, 776 (1950).

The methyl red adsorption test is carried out by agitating a suspension of a few tenths of a gram of a dried silica or esterified silica sample to be tested in 25 ml. of an anhydrous benzene solution containing 0.6 to 0.7 gram of the acid form of methyl red p-dimethylamino-azobenzen-o-carboxylic acid,

$$(CH_3)_2NC_6H_4N=NC_6H_4COOH,$$

per liter. No more than about 0.7 gram of the sample should be used in the test. With voluminous samples less than 0.7 gram, say, for instance, 0.4 gram, should be used to avoid getting a mixture too thick to handle.

The amount of sample used in the methyl red adsorption test should provide, as near as possible, a total hydroxylated surface area of 10 m.2 in the test. The test mixture is agitated for a period of about two hours at a temperature of about 25° C. to reach equilibrium conditions. An equilibrium concentration of 400 milligrams of dye per liter insures saturation adsorption.

The decrease in dye concentration in the benzene sotion is determined by adsorption spectrophotometric observations at 4750 A. of both the original and equilibrium benzene solutions of methyl red. The specific hydroxylated surface area in m.²/g. is calculated from the formula:

$$\frac{\text{grams dye adsorbed} \times 116 \times 10^{-20} \times \text{Avogadro's No.}}{\text{grams silica employed} \times \text{molecular weight of methyl red}}$$

where the covering power of each adsorbed methyl red molecule is approximately 1.16 square millimicrons.

When the surfaces of the siliceous materials are esterified, the methyl red dye will not be adsorbed on the esterified portions of the surface; that is, on the portions of the surface not covered by silanol groups. Consequently, measurement of the adsorption of methyl red dye before and after the siliceous material has been subjected to a process of my invention shows a decrease which is proportional to the decrease in exposed specific hydroxylated surface area.

Since the amount of dye adsorbed by the sample is measured by difference, the probable error, percentagewise, increases as the amount of adsorbed dye decreases. Thus, for specific hydroxylated surface areas of 100 m.²/g., variations of as much as 5 m.²/g. are possible. For samples which have a specific surface area of about 100 m.²/g. as determined by nitrogen adsorption, and which adsorb very little dye, a value for the hydroxylated surface area of less than 5 m.²/g. is considered to be essentially zero.

In the products of the invention the —ORO— groups are chemically bound to the substrate. The products should not be confused with compositions in which a glycol is merely physically adsorbed on the surface of the siliceous solid. Adsorbed glycols can be removed by heating the material at relatively low temperature, for example, 150° C. under high vacuum, say, 10⁻⁵ millimeters of mercury for a period of one hour. In contrast, the products of my invention are stable under such treatment. Neither can the ester groups be removed by washing with hot methyl ethyl ketone or similar solvents or by prolonged extraction in a Soxhlet extractor. In case of ordinary physical adsorption the alcohol is displaced by such treatment.

The products of the invention find utility in those fields in which organophilic and hydrophobic materials are used. The products are particularly useful as grease thickeners and as fillers for plastics and elastomers such as, for instance, natural rubber, GR–S rubber and silicone rubber.

The invention will be better understood by reference to the following illustrative example:

*Example 1*

A silica powder is obtained by the gelation of a commercially available 30% silica sol consisting of 17 millimicron colloidal particles and known as "Ludox" Colloidal Silica and by drying the gel at a temperature of 110° C. for a period of twenty-four hours at a pH of about 4.5. Products of this character are described and claimed in the copending application of Max F. Bechtold and Omar E. Snyder, Serial No. 256,142, filed November 13, 1951.

The dried material, which is in the form of coherent aggregates of dense, ultimate units of amorphous silica, is dispersed to a free-flowing powder by the use of a micropulverizer.

A portion of the aforementioned powder is heated in a muffle furnace in the presence of air for a period of two hours at a temperature of 625° C. in accordance with the invention described and claimed in the copending U. S. application of Warren K. Lowen, Serial No. 261,139, filed December 11, 1951. The heat treatment activates the siliceous surface towards reaction with hydroxy groups.

Ten parts of the surface-activated silica is slurried into a solution consisting of 0.5 part by weight of hexamethylene glycol and about 260 parts by weight of xylene. The resulting mixture is heated at a temperature of about 135° C. for a period of 3 hours in order to effect surface esterification. The slurry is allowed to cool slowly and then filtered. The surface-esterified silica is collected, washed with acetone, and vacuum dried at a temperature of 102° C. for a period of 16 hours.

The dried product is organophilic. The pronounced compatibility of the product with organic solvents is evidence that the surface of the estersil is substantially non-polar. In other words, both of the hydroxyl groups of hexamethylene glycol have reacted with the silica surface. The fact that reaction between both OH groups of the glycol and the silica surface has occurred is further substantiated by a polar surface area measurement of the product utilizing the methyl red dye adsorption test. The hydroxylated surface area of the product as determined by the methyl red dye test is 15 m.²/g. The total specific surface area as measured by nitrogen adsorption is about 175 m.²/g.

I claim:

1. A solid consisting essentially of substrate particles of inorganic siliceous material having an average specific surface area of from 1 to 900 square meters per gram, having an average particle diameter greater than about 1 millimicron, and having chemically bound to the silicon atoms on the surface of said particles at least 100 —ORO— groups per 100 square millimicrons of surface area of the siliceous material, where R is a divalent hydrocarbon radical having from 2 to 18 carbon atoms in which each of the carbon atoms attached to oxygen is also attached to at least one hydrogen atom.

2. A powder consisting essentially of substrate particles of amorphous silica having an average specific surface area of from 25 to 900 square meters per gram, having an average particle diameter greater than about 1 millimicron, and having chemically bound to the silicon atoms on the surface of said particles at least 100 —ORO— groups per 100 square millimicrons of surface area of substrate surface, where R is a divalent hydrocarbon radical having from 2 to 18 carbon atoms in which each of the carbon atoms attached to oxygen is also attached to at least one hydrogen atom.

3. A powder consisting essentially of substrate particles of amorphous silica in a supercolloidal state of subdivision having an average specific surface area of from 1 to 900 square meters per gram, having an average pore diameter of at least 4 millimicrons, and having chemically bound to the silicon atoms on the surface of said particles at least 100 —ORO— groups per 100 square millimicrons of surface area of the siliceous material, where R is a divalent hydrocarbon radical having from 2 to 18 carbon atoms in which each of the carbon atoms attached to oxygen is also attached to at least one hydrogen atom.

4. A powder consisting essentially of substrate particles of amorphous silica in a supercolloidal state of subdivision having an average specific surface area of from 25 to 900 square meters per gram, having an average pore diameter of at least 4 millimicrons, and having chemically bound to the silicon atoms on the surface of said particles at least 100 —ORO— groups per 100 square millimicrons of surface area of the siliceous material, where R is a divalent hydrocarbon radical having from 2 to 18 carbon atoms in which each of the carbon atoms attached to oxygen is also attached to at least one hydrogen atom.

5. A process which comprises the step of chemically reacting in a hydrocarbon which is a solvent for the glycol, a glycol of the formula HOROH in which R is a divalent hydrocarbon radical having from 2 to 18 carbon atoms, wherein each of the carbon atoms attached to oxygen is also attached to at least one hydrogen, in a hydrocarbon which is a solvent for the glycol, with an inorganic siliceous material having an average specific surface area of from 1 to 900 square meters per gram, having an average particle diameter greater than about 1 millimicron, and having a reactive surface containing groups selected from the class consisting of silanol and heat-activated silicon-oxygen groups, while maintaining the water content of the system below about 5 per cent by weight of the glycol in the system and the temperature in the range from 100° C. to the thermal decomposition temperature of the glycol.

6. A process which comprises the step of chemically reacting at a temperature of at least 100° C. and in an aromatic hydrocarbon solvent a glycol of the formula HOROH in which R is a divalent hydrocarbon radical having from 2 to 18 carbon atoms, wherein each of the carbon atoms attached to oxygen is also attached to at least one hydrogen, with an inorganic siliceous material in a supercolloidal state of subdivision, having an average specific surface area of from 1 to 900 square meters per gram, having an average particle diameter greater than about 1 millimicron, and having a reactive surface containing groups selected from the class consisting of silanol and heat-activated silicon-oxygen groups, while maintaining the water content of the system below about 5 per cent by weight of the glycol in the system and the temperature in the range from 100° C. to the thermal decomposition temperature of the glycol.

7. A process which comprises the step of chemically reacting in the presence of an aromatic hydrocarbon solvent a glycol of the formula HOROH in which R is a divalent hydrocarbon radical having from 2 to 18 carbon atoms, wherein each carbon atom attached to oxygen is also attached to at least one hydrogen, with an inorganic siliceous material in a supercolloidal state of subdivision, having an average specific surface area of from 1 to 900 square meters per gram having an average particle diameter greater than about 1 millimicron, and having a reactive surface containing groups selected from the class consisting of silanol and heat-activated silicon-oxygen groups, while maintaining the water content of the system below about 5% by weight of the glycol in the system and the temperature in the range from 100° C. to the thermal decomposition temperature of the glycol until at least 100 —ORO— groups per 100 square millimicrons of surface area of said inorganic siliceous solid are chemically bound thereto.

References Cited in the file of this patent

UNITED STATES PATENTS

| | | |
|---|---|---|
| 2,395,880 | Kirk | Mar. 5, 1946 |
| 2,438,379 | Archibald et al. | Mar. 23, 1948 |
| 2,454,941 | Pierce et al. | Nov. 30, 1948 |